United States Patent [19]
Furuhashi et al.

[11] Patent Number: 5,787,397
[45] Date of Patent: *Jul. 28, 1998

[54] INTERRUPT INFORMATION GENERATING APPARATUS AND SPEECH INFORMATION PROCESSING APPARATUS

[75] Inventors: Makoto Furuhashi, Kanagawa; Masakazu Suzuoki, Tokyo, both of Japan

[73] Assignee: Sony Corporation, Tokyo, Japan

[*] Notice: The term of this patent shall not extend beyond the expiration date of Pat. No. 5,655,059.

[21] Appl. No.: 838,424

[22] Filed: Apr. 7, 1997

Related U.S. Application Data

[63] Continuation of Ser. No. 328,423, Oct. 25, 1994, Pat. No. 5,655,059.

[30] Foreign Application Priority Data

Oct. 27, 1993 [JP] Japan ................................. 5-268906

[51] Int. Cl.⁶ .................................. G10L 5/02; G10L 9/00
[52] U.S. Cl. ........................ 704/267; 704/503; 704/504
[58] Field of Search ............................ 704/267, 503, 704/504

[56] References Cited

U.S. PATENT DOCUMENTS

5,655,059   8/1997   Furuhashi ........................... 704/267

Primary Examiner—David R. Hudspeth
Assistant Examiner—Robert Louis Sax
Attorney, Agent, or Firm—Frommer Lawrence & Haug LLP; William S. Frommer

[57] ABSTRACT

An apparatus for generating the interrupt information includes an addressing device for generating the specified address information for specifying the desired information stored in a memory device, a readout address generating device for generating the readout address information of the desired information stored in the memory device, and a comparator device for comparing the specified address information from the addressing device and the readout address information from the readout address generating device and for generating the interrupt information in case of coincidence of the specified address information and the readout address information and supplying the interrupt information to a central processing unit. Since the interrupt data is supplied to the central processing unit at the playback timing of the desired sound source data, reproduction of the sound source data can be detected, so that it is unnecessary for the central processing unit to poll the address of the sound source data at all time and hence the load imposed on the central processing unit may be correspondingly decreased.

1 Claim, 5 Drawing Sheets

INTERRUPT INFORMATION GENERATING APPARATUS AND SPEECH INFORMATION PROCESSING APPARATUS

This application is a continuation of application Ser. No. 08/328,423, filed Oct. 25, 1994 now U.S. Pat. No. 5,655,059.

BACKGROUND OF THE INVENTION

This invention relates to an interrupt information generator and a speech information processor advantageously employed for an electronic musical instrument or a television game device.

The sound source employed in general in an electronic musical instrument or a television game device may be roughly classified into an analog sound source, such as a voltage-controlled oscillator (VCO), a voltage-controlled amplifier (VCA), a voltage-controlled filter (VCF) etc., and a digital sound source, such as a programmable sound generator (PSG) or a zigzag readout type ROM.

Figure 4:
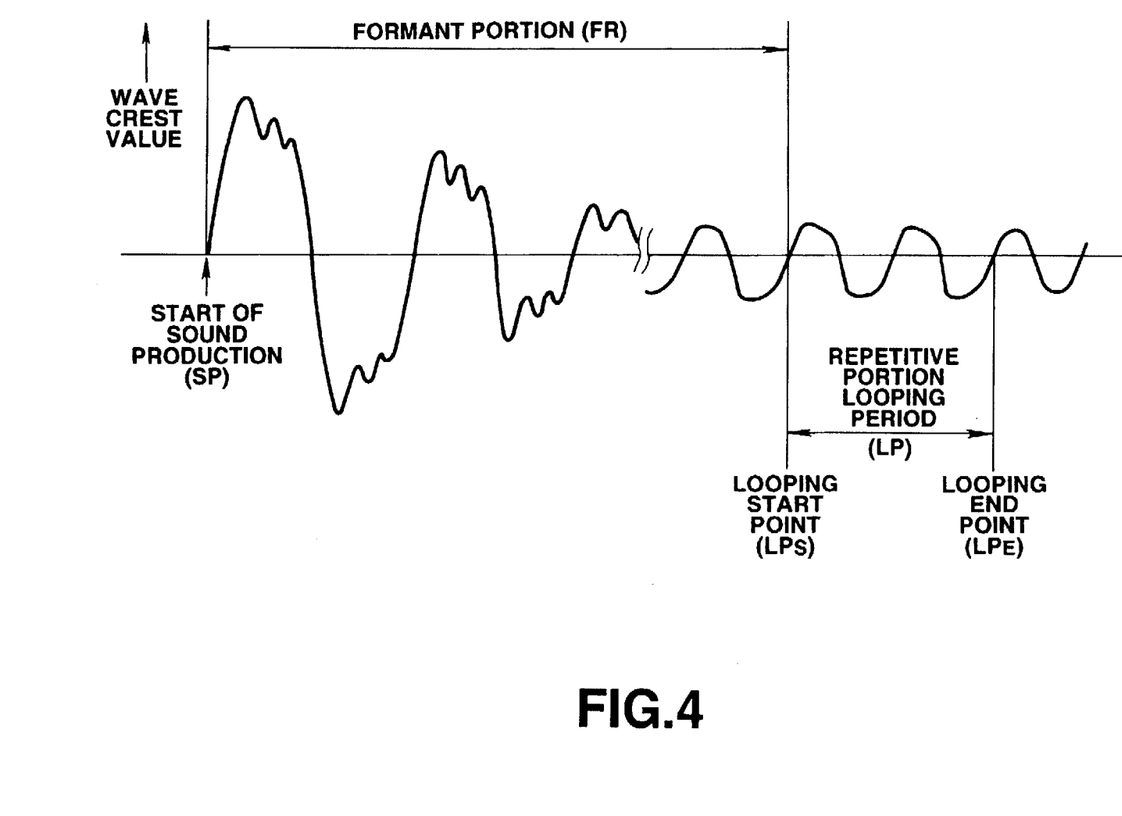
FIG. 4 is a graph showing sound source data of the non-interval portion and sound source data of the interval portion, stored separated from each other in a sampler sound source.

The above-mentioned sound source (sampler sound source) stores only sound source data of a pre-set pitch (interval) compressed by compression with, for example, non-linear quantization. Each sound source data is stored in two parts, that is in a formant portion (FR) and a one-period portion (LP) of plural repeated constant period waveforms following the formant portion, as shown in FIG. 4. The formant portion is a signal waveform at the initial stage of sound production proper to each musical instrument, such as an operating sound produced since a key of a keyboard is struck until a hammer hits the string in the case of a piano. During readout of the sound source data the formant portion is read out first and the one-period portion is read out a plurality of numbers of times.

Since the above sound source data is compressed, and only the required portions, that is the above formant portion and the one-cycle repetitive portion, are extracted and stored, a large quantity of sound source data may be stored in a smaller storage area.

Figure 5:
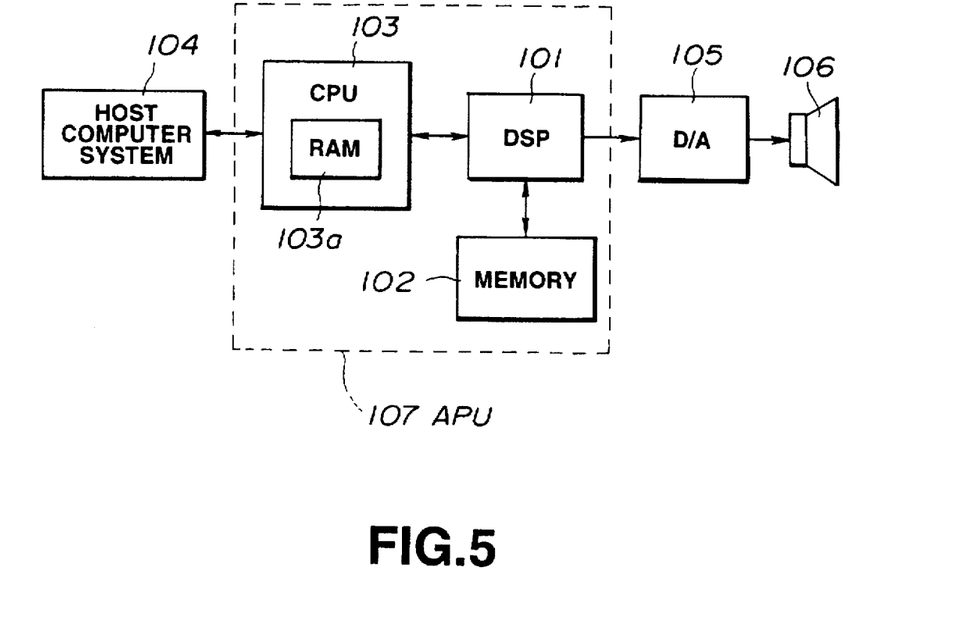
FIG. 5 is a block diagram showing a conventional speech information processor.

As a general speech information processor for data processing of the sampler sound source, there is known an audio processing unit (APU) 107 consisting of a digital signal processing unit (DSP) 101, a memory 102 and a central processing unit (CPU) 107, as shown in FIG. 5.

In this figure, the APU 107 is connected to a host computer 104, provided in a customary personal computer, a digital electronic musical instrument or a TV game device.

The host computer 104 includes a ROM cassette storing the above-mentioned sound source data, the control program etc. The control program stored in the ROM cassette is read out by the CPU 103 so as to be stored in a working memory 103a therein.

The CPU 103 causes the sound source data to be read out from the ROM cassette and transiently stored in the memory 102, based upon the above-mentioned control program. The CPU 103 also controls the DSP 101 responsive to control by the CPU 103. The DSP 101 causes the sound source data stored in the memory 102 to be read out under control by the CPU 103 and processes the sound source data thus read out with, for example, bit expansion or pitch conversion. The processed sound source data, outputted by the DSP 101, is fed by a D/A converter 105 and thereby converted into analog speech signals which are fed to a speaker unit 106. Thus an acoustic output corresponding to the speech sound data may be produced via the speaker unit 106.

The speech information processor has the continuous playback function of continuously reproducing the sound source data after re-writing a portion of the sound source data, and the multi-loop playback function of repeatedly reproducing each of plural sound source data a pre-set number of times.

If, with the continuous reproduction, the first sound source data and the second sound source data are stored in the memory 102 in succession, the CPU 103 controls the DSP 101 in order to reproduce the data sequentially from the first sound source data first. In the CPU 103 and the DSP 101, the access timing to the memory 102 is pre-set so that DSP 101 accesses the memory 102 twice and subsequently the CPU 103 accesses the memory once. The CPU 103 perpetually polls the end point of the first sound source. The CPU 103 controls the writing in the memory 102 so that, when the end point of the first sound source data is surpassed and the second sound source data starts to be reproduced, the first sound source data is rewritten to and replaced by the third sound source data at the access timing of the CPU 103. The CPU 103 also controls the writing in the memory 102 so that, when the end point of the second sound source data is surpassed and the third sound source data starts to be reproduced, the second sound source data is replaced by the fourth sound source data at the access timing of the CPU 103.

Such control assures continuous reproduction of the sound source data.

If, with the multi-loop playback function, the sound source data of the first formant portion, the sound source data of the first repetitive portion following the sound source data of the first formant portion, the sound source data of the second formant portion and the sound source data of the second repetitive portion following the sound source data of the second formant portion, are stored in succession in the memory 102, the CPU 103 causes the DSP 101 to reproduce the sound source data sequentially beginning from the sound source data of the first formant portion. The CPU 103 perpetually polls the end point of the sound source data of the first repetitive portion. When the end point of the first repetitive portion is detected, the CPU 103 increments a counter, not shown, while causing the DSP 101 to reproduce the sound source data of the first repetitive portion from the outset. Thus the CPU 103 causes the DSP 101 to continuously reproduce the sound source data of the first repetitive portion a plurality of number of times, while incrementing the counter and causing the DSP 101 to reproduce the sound source data of the second formant portion when the count value of the counter reaches a pre-set value.

The CPU 103 perpetually polls the end point of the sound source data of the second repetitive portion. When the end point of the second repetitive portion is detected, the CPU 103 increments the counter, while causing the DSP 101 to reproduce the sound source data of the second repetitive portion from the outset. Thus the CPU 103 causes the DSP 101 to continuously reproduce the sound source data of the second repetitive portion a plurality of number of times, while incrementing the counter and causing the DSP 101 to reproduce the sound source data of the first formant portion when the count value of the counter reaches a pre-set value.

Such control assures reproduction of the sound source data of the repetitive portion a pre-set number of times by way of multi-loop reproduction.

The present Assignee has filed, as a related patent application, the EP Publication No. 0,543,667, and a corresponding patent application (now pending) in USA.

If, with the above-described speech information processor employing the APU 107, the sound source data is to be reproduced continuously, the CPU 103 needs to read out the end point of the first sound source data, the second sound source data and so forth frequently and to perpetually poll the end point of the sound source data. On the other hand, if the sound source data is to be reproduced by multi-loop reproduction, the CPU 103 similarly needs to read out the end point of the sound source data of the first repetitive portion, the sound source data of the second repetitive portion and so forth frequently and to perpetually poll the end point of the sound source data.

Such frequent readout of the end point loads the CPU 103 excessively in case of the continuous reproduction or multi-loop reproduction.

OBJECT AND SUMMARY OF THE INVENTION

In view of the above-depicted problems of the prior art, it is an object of the present invention to provide an interrupt information generator and a speech information processor whereby the load imposed on the CPU may be relieved in case of the continuous reproduction or multi-loop reproduction.

In one aspect, the present invention provides an apparatus for generating the interrupt information comprising addressing means for generating the specified address information for specifying the desired information stored in memory means, readout address generating means for generating the readout address information of the desired information stored in the memory means, and comparator means for comparing the specified address information from the addressing means and the readout address information from the readout address generating means and for generating the interrupt information in case of coincidence of the specified address information and the readout address information.

In another aspect, the present invention provides an apparatus for processing the speech information in which first execution means write the speech information and second execution means read out the speech information written in the memory means and process the read-out speech information with preset information processing for outputting the processed speech information. The apparatus comprises addressing means for generating the specified address information for specifying the desired information stored in the memory means, readout address generating means for generating the readout address information of the desired information stored in the memory means, and comparator means for comparing the specified address information from the addressing means and the readout address information from the readout address generating means and for generating the interrupt information in case of coincidence of the specified address information and the readout address information. When supplied with the interrupt information from the comparator means, the first execution means controls the memory means so that, of the speech information stored in the memory means, the speech information already read out by the second execution means is rewritten. The first execution means then controls the addressing means for newly specifying the rewritten speech information.

In still another aspect, the present invention similarly provides an apparatus for processing the speech information in which first execution means write the speech information and second execution means read out the speech information written in the memory means and process the read-out speech information with preset information processing for outputting the processed speech information. The apparatus comprises addressing means for generating a specified address for specifying the desired information stored in memory means, readout address generating means for generating the readout address information of the desired information stored in the memory means, and comparator means for comparing the specified address information from the addressing means and the readout address information from the readout address generating means and for generating the interrupt information in case of coincidence of the specified address information and the readout address information. When supplied with the interrupt information from the comparator means, the first execution means controls the second execution means so that, of the speech information stored in the memory means, the speech information is repeatedly read out in a pre-set amount as from the address at which the interrupt information is supplied. The first execution means detects the number of times of delivery of the interrupt information for detecting the number of times of repeated read-out of the pre-set amount of the speech information. The first execution means also controls the addressing means so that, when the number of times of repeated readout reaches a pre-set value, the address of the speech information to be repeatedly read out next time will become a new specified address.

With the interrupt information generator according to the present invention, the addressing means feeds the specified address information for specifying the desired information stored in memory means to comparator means. The readout address generating means also feeds the readout address information of the desired information stored in the memory means to the comparator means. The comparator means compares the readout address information from the readout address generating means to the specified address information from the addressing means and, if the readout address information and the specified address information coincide with each other, the comparator means issues and transmits the interrupt information to, for example, the central processing unit (CPU).

Thus the interrupt information is outputted at the readout timing of the information stored in the address specified by the addressing means. Consequently, by setting the address specified by the addressing means at, for example, an end point of the desired information, it becomes possible for the CPU to detect the end point, based upon the interrupt information supplied thereto, without the necessity of perpetually polling the end point, thus correspondingly relieving the load imposed on the CPU.

With the speech information processor according to the present invention, the CPU, as first execution means, writes the speech information in memory means, while the digital signal processor (DSP), as the second execution means, such as the second signal processor, reads out the speech information written in the memory means, and processes the read-out speech information in a pre-set manner before outputting the speech information. During the continuous reproduction in which the sound source data is partially rewritten after reproduction, the first speech information and the second speech information are consecutively written in the memory means.

The CPU then controls the addressing means for outputting the specified address information indicating the leading address, for example, of the second speech information stored in the memory means. This specified address information is fed to the comparator means. The DSP controls the addressing means for outputting the readout address information so that the speech information will be sequentially reproduced beginning from the first speech information. The comparator means compares the specified address information and the readout address information and, if these two coincide with each other, transmit the interrupt information to the CPU.

Thus the interrupt information is fed to the CPU at the playback timing of the leading address of the second speech information.

When fed with the interrupt information from the comparator means, the CPU controls the writing in the memory means so that, of the speech information stored in the memory means, the first speech information already read out by the DSP is rewritten to the third speech information. The CPU also controls the addressing means for outputting the specified address information indicating the leading address of the third speech information. Next, the interrupt information is supplied to the CPU at the timing of reproduction of the leading address of the third speech information. When fed with the interrupt information, the CPU controls the writing in the memory means for rewriting the second speech information read out completely by the DSP to the fourth speech information, while controlling the addressing means for outputting the specified address information indicating the leading address of the fourth speech information.

By repetition of the above-described control operations, the speech information may be continuously reproduced using a smaller storage area of the memory means. The interrupt information is outputted at the readout timing of the next speech information. Thus it becomes possible for the CPU to detect the end point, based upon the interrupt information supplied thereto, without the necessity of perpetually polling the end point, thus correspondingly relieving the load imposed on the CPU.

With the speech information processor according to the present invention, the CPU, as first execution means, writes the speech information in memory means, while the digital signal processor (DSP), as the second execution means, such as the second signal processor, reads out the speech information written in the memory means, and processes the read-out speech information in a pre-set manner before outputting the speech information, as described previously. During the multi-loop reproduction, in which each of plural sound source data is repeatedly reproduced a number of times, the speech information of the first formant portion, the speech information of the first repetitive portion following the first formant portion, the speech information of the second formant portion and the speech information of the second repetitive portion following the second formant portion, are consecutively written in the memory means.

The CPU then controls the addressing means for outputting the specified address information indicating the leading address, for example, of the speech information of the first repetitive portion stored in the memory means. This specified address information is fed to the comparator means. The DSP, on the other hand, controls the address generating mans for outputting the readout address information so that the speech information will be sequentially reproduced beginning from the speech information of the first formant portion. The readout address information is supplied to the comparator means. The comparator means compares the specified address information to the readout address information and, if the two coincide with each other, outputs the interrupt information to the CPU.

Thus the interrupt information is supplied in this case at the playback timing of the speech information of the leading address of the speech information of the first repetitive portion.

When fed with the interrupt information from the comparator means, the CPU controls the DSP for reading out the speech information of the first repetitive portion. Thus the interrupt information is fed to the CPU each time the speech information of the leading address of the first repetitive portion of the speech information is reproduced. The CPU detects the number of times the interrupt information is supplied thereto in order to detect the number of times of repeated reading of the speech information of the first repetitive portion. The CPU controls the addressing means so that, when the number of times of repeated reading reaches a pre-set value, that is when the interrupt information is supplied a pre-set number of times, the specified address information indicating the leading address, for example, of the speech information of the second repetitive portion to be repeatedly reproduced next time will be outputted. In this manner, after reproducing the speech information of the second formant portion, the interrupt information is supplied to the CPU at the timing of reproduction of the speech information of the second repetitive portion. When fed with the interrupt information, the CPU controls the DSP for repeatedly reproducing the speech information of the second repetitive portion in the same manner as described above. The CPU detects the number of times of delivery of the interrupt information for detecting the number of times the speech information of the second repetitive portion is read out repeatedly. When the number of times of repeated readout reaches a pre-set value, the CPU controls the addressing means for outputting the specified address information indicating the leading address, for example, of the speech information of the first repetitive portion to be repeatedly reproduced next.

The above-mentioned multi-loop reproduction may be carried out by such repetition of the control operations. The interrupt information is outputted at the readout timing of the speech information of the repetitive portion read out repeatedly a plural number of times. Thus it becomes possible for the CPU to detect the end point, based upon the interrupt information supplied thereto, without the necessity of perpetually polling the end point, thus relieving the load on the CPU correspondingly.

Thus, with the interrupt information generating apparatus in the first aspect of the present invention, the interrupt information can be outputted at the readout timing of the information of the specified address on the memory means. Consequently, should the interrupt information generator be provided in an equipment having the function of continuous reproduction by partially rewriting the information following the end of reproduction, and the multi-loop playback function of repeatedly reproducing each of plural sound source data a pre-set number of times, the interrupt information maybe outputted at the playback timing of the desired address information. Thus it is unnecessary for the CPU taking charge of control of the continuous reproduction and the multi-loop reproduction to poll the address of the desired information at all times, thereby relieving the load on the CPU correspondingly.

With the interrupt information generating apparatus in the second aspect of the present invention, the interrupt information can be outputted at the readout timing of the information of the specified address on the memory means. Thus, should the speech information be continuously reproduced by partially writing the speech information after the end of reproduction, the interrupt information can be outputted at the reproduction timing of the desired address information. Thus it is unnecessary for the first execution means taking charge of control of the continuous reproduction to poll the address of the desired information at all times for correspondingly relieving the load on the first execution means.

With the interrupt information generating apparatus in the third aspect of the present invention, the interrupt information can be outputted at the readout timing of the information of the specified address on the memory means. Thus, should the speech information be reproduced by multi-loop reproduction by repeatedly reproducing each plural sound source information data a pre-set number of times, the interrupt information can be outputted at the reproduction timing of the speech or sound source information of the desired address. Thus it is unnecessary for the first execution means taking charge of control of the multi-loop reproduction to poll the address of the desired information at all times for correspondingly relieving the load on the first execution means.

Thus the interrupt information generator and the speech information processor of the present invention contribute to the extension of the service life of the CPU or the first execution means.

DESCRIPTION OF THE PREFERRED EMBODIMENTS

Referring to the drawings, preferred embodiments of the interrupt information generator and the speech information processor according to the present invention will be explained in detail.

Figure 1:
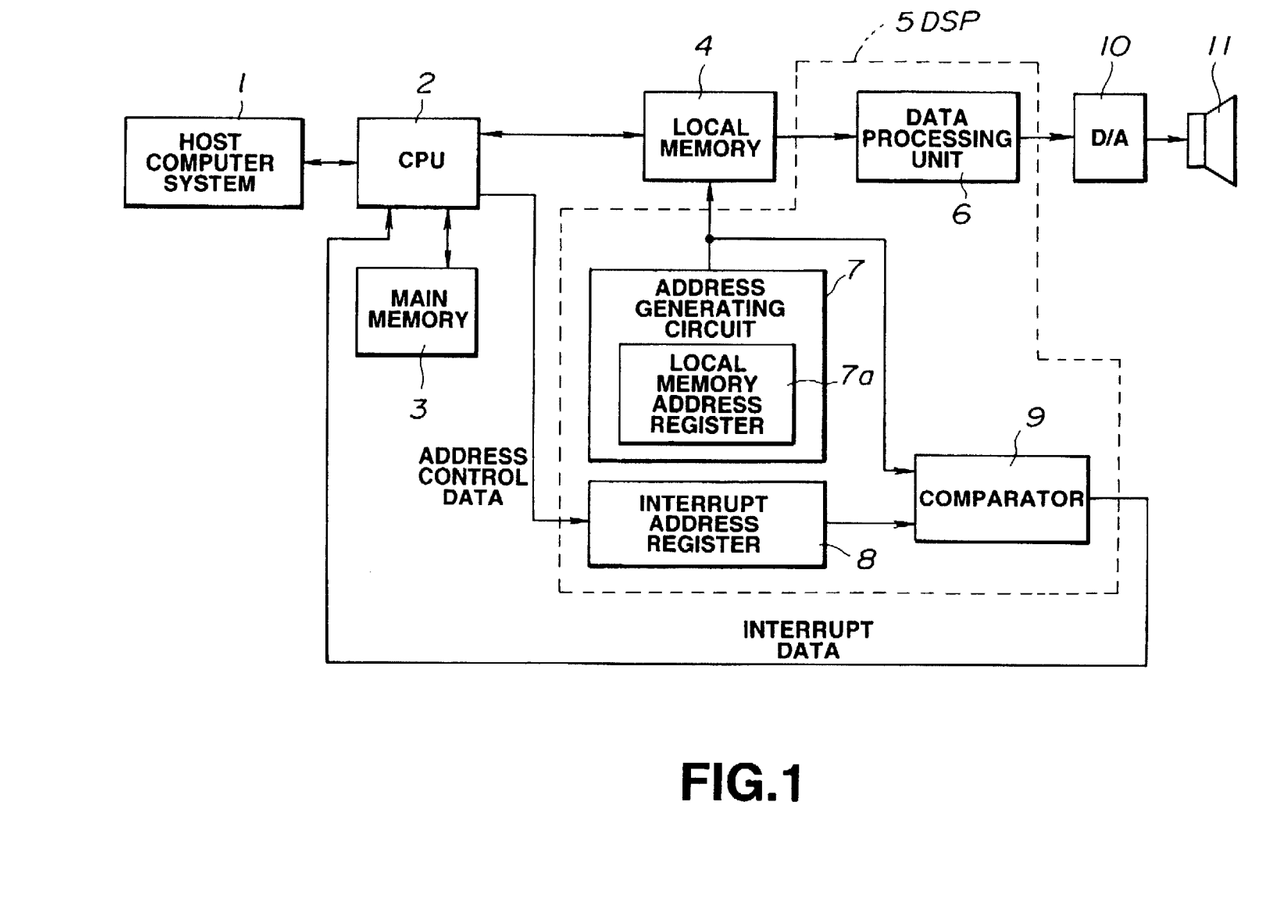
FIG. 1 is a block diagram showing an embodiment of the present invention in which the interrupt information processor and a speech information processor are provided in a television game device having a continuous playback function and a multi-loop function.

The speech information processor according to the present invention may be applied to a television game machine as shown in FIG. 1. With the television game machine, a central processing unit (CPU) 2, as first executing means, is connected to a host computer system 1 in which there is provided a sound source ROM having sound source data, control programs for carrying out the television game etc., previously stored therein. The CPU 2 is connected to a main memory 3 for storing the control programs etc. read out from the sound source ROM and to a local memory 4 for storing the sound source data read out from the sound source ROM. The local memory 4 is connected to a digital signal processor (DSP) 5, as second executing means, which in turn is connected to a D/A converter 10. The D/A converter 10 is connected to a speaker unit 11.

In the sound source ROM, 16-bit sound source data of various musical instruments, such as piano, saxophone or cymbals, are stored in a 4-bit compressed form. The sound source data having a non-interval (non-pitch) portion, such as a formant portion FR shown in FIG. 4, such as sound source data of a piano, are stored divided into a non-interval portion and an interval portion (a repetitive portion LP shown in FIG. 4).

The local memory 4 has a storage capacity of, for example, 64 kbytes, with a memory access time being 330 ns for each memory access operation. The programs for the CPU 2 are stored in the local memory 4 in addition to the sound source data. Two execution cycles of the DSP 5 are carried out for each execution cycle of the CPU 2, and the local memory 4 is time-divisionally employed for these execution cycles.

The DSP 5 is made up of an address generator 7 as readout address generating means for supplying readout addresses for reading out sound source data stored in the local memory 4 to the local memory 4, an interrupt address register 8 as address designating means for outputting a specified address for designating a leading address, for example, of desired sound source data of the local memory 4, and a comparator 9 as comparator means for comparing the readout address and the specified address and for supplying interrupt data to the CPU 2 in case of coincidence of the two addresses.

The address generator 7, interrupt address register 8 and the comparator 9, constituting the DSP 5, make up an interrupt information generator according to the present invention.

The operation of the above-described television game device of the present embodiment is as follows:

When the game is started, the CPU 2 reads out sound source data and the control programs from the sound source ROM of the host computer 1 during the execution cycle of the CPU 2, while controlling the main memory 3 for storing the control programs and controlling the local memory 4 for storing the sound source data.

As the game progresses, the CPU 2 reads out the control programs from the main memory 3, and controls the DSP 5 based upon the control programs. The DSP 5 reads out the sound source data from the local memory 4 during the execution cycle of the CPU 2 under control by the CPU 2. The data processing unit 6 processes the read-out 4-bit sound source data, for example, by data expansion for expanding the data to 16 bits and by echoing for adding echo to the data. The processed data is supplied to the D/A processor 10 converts the sound source data into analog signals to generate speech signals which are outputted to the speaker unit 11. Thus an acoustic signal corresponding to the speech signals can be produced by the speaker unit 11.

By employing the sole local memory 4 time-divisionally by the CPU 2 and the DSP 5, it becomes possible to improve the exploiting efficiency of the local memory 4 and to realize the inexpensive local memory 4 with the small storage capacity, thereby lowering the production cost.

Figure 2:
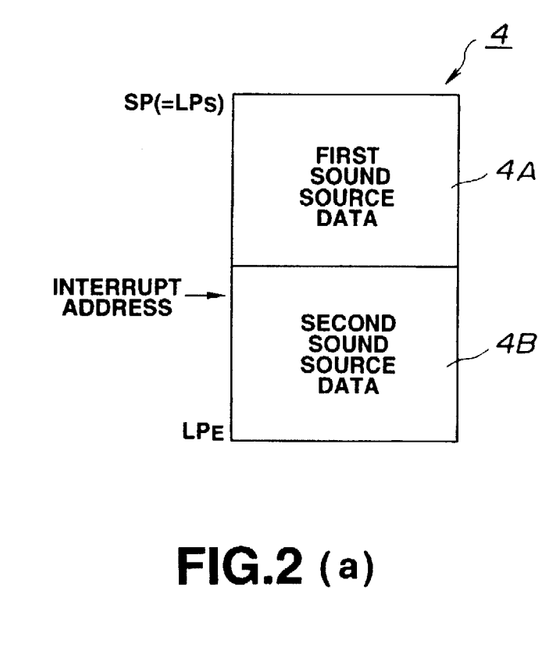
FIGS. 2a and 2b are diagrammatic views showing a local memory for illustrating the continuous playback function of the television game device shown in FIG. 1.

During continuous playback for continuously reproducing the sound source data by partially rewriting the sound source data after the end of reproduction, the CPU 2 causes the first sound source data and the second sound source data read out from the sound source ROM to be respectively written in the first storage area 4A and in the second storage area 4B of the local memory 4, as shown in FIG. 2a.

The CPU 2 causes the interrupt address register 8 to output the specified address data indicating the leading address, for example, of the second sound source data stored in the local memory 4. The specified address data indicating the leading address of the second sound source data outputted from the interrupt address register 8 is fed to the comparator 9.

The DSP 5 causes the address generating circuit 7 to output the readout address data for sequentially reproducing the sound source data, from the first sound source data first, via the local memory address register 7a of the address generator 7. This readout address data is fed to the comparator 9.

The comparator 9 compares the specified address data and the readout address data to each other and, incase of coincidence of the two data, outputs an interrupt data to the CPU 2.

That is, in such case, the interrupt data is fed to the CPU 2 at the playback timing of the sound source data of the leading address of the second sound source data, as shown by arrow in FIG. 2a.

When fed with the interrupt data from the comparator 9, the CPU 2 controls the writing in the local memory 4 for rewriting the first sound source data already read out by the DSP 5 to the third sound source data, as shown in FIG. 2b. The first and third sound source data are among the sound source data stored in the local memory 4. Also the CPU 2 controls the interrupt address register 8 for outputting the specified address data indicating the leading address of the third sound source data, as shown by arrow in FIG. 2b.

Thus the interrupt data is fed to the CPU 2 at the playback timing of the sound source data of the leading address of the third sound source data. When fed with the interrupt data, the CPU 2 controls the local memory 4 for rewriting the second sound source data already read out by the DSP 5 to the fourth sound source data, while controlling the interrupt address register 8 for outputting the specified address indicating the leading address of the fourth sound source data.

By repeating the above control operations, the sound source data may be continuously reproduced using the smaller storage area of the local memory 4. As mentioned above, the interrupt data is outputted at the readout timing of the next sound source data. Thus, by the above interrupt data, it is possible for the CPU 2 to detect the end point of the desired sound source data without the necessity of perpetually polling the end of the sound source data. Thus the load imposed on the CPU 2 is correspondingly relieved to assure a longer service life of the CPU 2.

Figure 3:
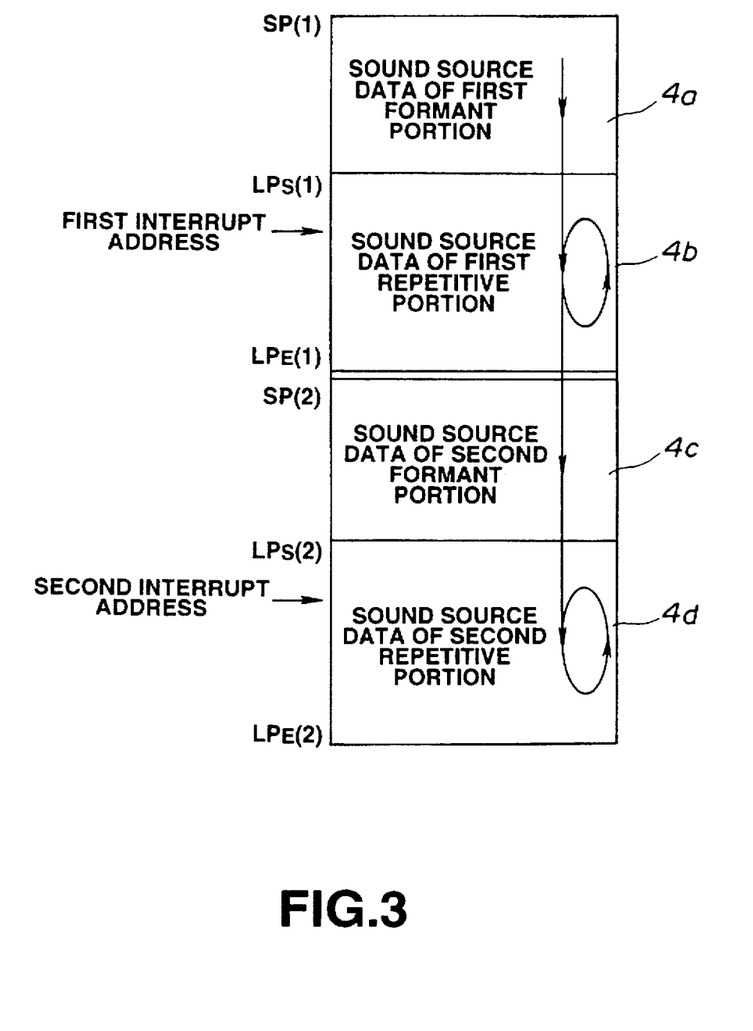
FIG. 3 is a diagrammatic view of the local memory for illustrating the multi-loop function of the television game device shown in FIG. 1.

During the multi-loop reproduction when each of plural sound source data is repeatedly reproduced a number of times, the CPU 2 controls the local memory 4 for reading out the sound source data of the first formant portion, sound source data of the first repetitive portion succeeding to the first formant portion, sound source data of the second formant portion and the sound source data of the second repetitive portion succeeding to the second formant portion, from the sound source ROM, and for writing these sound source data in first to fourth storage areas 4a to 4d of the local memory 4, as shown in FIG. 3.

The CPU 2 then controls the interrupt address register 8 for outputting the specified address data indicating the leading address, for example, of the sound source data of the first repetitive portion written in the second storage area 4b. The specified address data are fed to the comparator 9.

The DSP 5 controls the address generating circuit 7 for outputting readout address data so that sound source data are sequentially outputted beginning with the sound source data of the first formant portion stored in the first storage area 4a. This readout address data is fed to the comparator 9.

The comparator 9 compares the specified address data to the readout address data an, in case of coincidence of the two address data, outputs interrupt data to the CPU 2.

That is, the interrupt data is supplied in this case to the CPU 2 at the playback timing of the leading address of the sound source data of the first repetitive portion.

When fed with the interrupt data from the comparator 9, the CPU 2 controls the DSP 5 for repeatedly reading out the speech data of the first repetitive portion stored in the second storage area 4b. Thus the interrupt data is supplied to the CPU 2 each time the leading address of the sound source data of the first repetitive portion is reproduced. The CPU 2 detects the number of times the interrupt data is supplied thereto in order to detect the number of times the speech data of the first repetitive portion is repeatedly read out. The CPU 2 controls the interrupt address register 8 so that, when the number of times of repeated readout reaches a pre-set number of times, that is when the interrupt data is supplied a pre-set number of times, the specified address data indicating the leading address, for example, of the sound source data of the second repetitive portion to be repeatedly read out next time, is outputted.

This routes the interrupt data to the CPU 2 at the timing of reproduction of the sound source data of the second repetitive portion stored in the fourth storage area 4c after reproduction of the sound source data of the second formant portion stored in the third storage area 4c. When fed with the interrupt data, the CPU 2 controls the DSP 5 for repeatedly reading out the sound source data of the second repetitive portion in the same manner as above. The CPU 2 detects the number of times the interrupt data is supplied thereto for detecting the number of times of repetitive readout of the sound source data of the second repetitive portion. The CPU 2 controls the interrupt address register 8 so that, when the number of times of repeated readout reaches a pre-set value, a specified address data indicating the leading address, for example, of the sound source data of the frost repetitive portion, is outputted.

The above-mentioned multi-loop reproduction may be achieved by repetition of the above control operations. The interrupt data is outputted at the readout timing of the sound source data of the repetitive portion read out in a repeated manner. Thus the load imposed on the CPU 2 is correspondingly relieved to assure a longer service life of the CPU 2.

In the above description, the interrupt information generator is applied to a television game device. However, the interrupt information generator may be applied to other equipment handling digital data, such as a digital picture processor.

Also, the speech information processor of the present invention may be applied to equipment handling sound source data, such as electronic musical instruments, in addition to the television game device described above.

Ultimately, in the above description, the storage capacity of the local memory 4 is 64 kbytes, and the memory access time is 330 ns. However, these numerical values are merely illustrative, and the interrupt information generator and the speech information processor of the present invention may be modified in desired manner without departing from the scope of the invention.

What is claimed is:

1. An apparatus for processing sound data information comprised of a formant portion and a one-period portion, said apparatus comprising:

a CPU for receiving sound data information and control programs and for controlling a continuous playback operation when playing back said formant portion and a multi-loop playback operation when playing back said one-period portion;

a local memory for receiving and storing the sound data information from said CPU;

a main memory for receiving and storing said control programs;

a host computer connected to said CPU for supplying said sound data information and said control programs to said CPU, and wherein said CPU controls the sound data information written in said local memory via said host computer;

digital signal processing means for reading out the stored sound data information from said local memory and for processing the read sound data information in a predetermined manner, said digital signal processing means including address generating means for generating address information for the sound data information stored in said local memory, interrupt address generating means responsive to an interrupt generating control signal supplied from said CPU for generating interrupt address information indicating end points of said formant portion and said one-period portion, and comparator means for comparing the address information from said address generating means and the interrupt address information from said interrupt address generating means and, upon a corresponding match thereof, for generating an interrupt signal and for supplying said interrupt signal to said CPU;

wherein during said continuous playback operation, said CPU upon receipt of the interrupt signal from said comparator means controls said local memory such that the formant portion of said sound data information stored in said local memory which corresponds to the sound data information already read out by the digital signal processing means is rewritten with other formant portion sound data information, and supplies said interrupt generating control signal to said interrupt address generating means so as to cause said interrupt address generating means to generate a new interrupt address corresponding to the end of the rewritten other formant portion sound data information, and wherein during said multi-loop playback operation, said CPU upon receipt of the interrupt signal from said comparator means (i) controls said digital signal processing means such that at least a portion of the read one-period portion of said sound data information is repeatedly read out a number of times from said local memory, (ii) detects the number of times the at least a portion of the read one-period portion of said sound data information is read out, and (iii) supplies said interrupt control signal to said interrupt address generating means so as to cause said interrupt address generating means to generate new interrupt address information indicating an end of another one-period portion when the detected number of times the at least a portion of the read one-period portion sound data information is read out is a pre-set number.

* * * * *